(12) United States Patent
Kim et al.

(10) Patent No.: US 9,939,959 B2
(45) Date of Patent: Apr. 10, 2018

(54) MULTI-TOUCH INTEGRITY SENSING FOR CAPACITIVE TOUCH SCREEN

(71) Applicant: STMicroelectronics Asia Pacific Pte Ltd, Singapore (SG)

(72) Inventors: Jerry Kim, Kyounggi-Do (KP); Tae-gil Kang, Seoul (KP); Glen Kang, Seoul (KP); Rooney Kim, Bakdal 1-Dong (KP)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 15/822,456

(22) Filed: Nov. 27, 2017

(65) Prior Publication Data

US 2018/0074651 A1 Mar. 15, 2018

Related U.S. Application Data

(63) Continuation of application No. 15/177,489, filed on Jun. 9, 2016.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04104* (2013.01)

(58) Field of Classification Search
CPC ................... G06F 3/044; G06F 3/0416; G06F 2203/04108; G06F 2203/04104; G06F 3/0418
USPC ................... 345/173, 174; 178/18.01, 18.06
See application file for complete search history.

(56) References Cited

U.S. PATENT DOCUMENTS

| | | | | |
|---|---|---|---|---|
| 8,564,564 | B2 * | 10/2013 | Chang | G06F 3/0418 345/156 |
| 8,717,331 | B2 | 5/2014 | Kremin et al. | |
| 8,773,146 | B1 | 7/2014 | Hills et al. | |
| 8,982,097 | B1 * | 3/2015 | Kuzo | G06F 3/0418 345/174 |
| 2013/0278543 | A1 * | 10/2013 | Hsu | G06F 3/044 345/174 |
| 2014/0204058 | A1 | 7/2014 | Huang et al. | |
| 2014/0306924 | A1 | 10/2014 | Lin et al. | |
| 2015/0049043 | A1 * | 2/2015 | Yousefpor | G06F 3/044 345/174 |

OTHER PUBLICATIONS

Anderson, Erik: "Design How-to: The Basics of Waterproofing Capacitive Touchscreens," EE Times, Jun. 6, 2012 (7 pages).

* cited by examiner

*Primary Examiner* — Koosha Sharifi-Tafreshi
(74) *Attorney, Agent, or Firm* — Gardere Wynne Sewell LLP (57) ABSTRACT

A method for multi-touch integrity sensing for a multi-touch capacitive touch screen is disclosed. By determining the integrity of touches, a distinction is identified between wanted touches, such as via a finger or stylus, and unwanted touches such as via foreign matter, errors, and the like.

6 Claims, 7 Drawing Sheets

MULTI-TOUCH INTEGRITY SENSING FOR CAPACITIVE TOUCH SCREEN

CROSS REFERENCE TO RELATED APPLICATION

This application is a continuation of U.S. patent application Ser. No. 15/177,489 filed Jun. 9, 2016, the disclosure of which is incorporated by reference.

FIELD OF THE INVENTION

The present disclosure generally relates to capacitive touchscreen panels and, more particularly, to a system and method for integrity sensing for use in a capacitive touchscreen panel.

BACKGROUND

Touchscreen panels are typically incorporated in various electronic devices to detect a user input (i.e., user touch or hover) and to display content. The touchscreen panels include an active portion capable of detecting the user input and displaying content. This active portion is typically formed from a display panel on top of which a capacitive sensing panel is provided which includes multiple layers of capacitive sensing circuitry arranged in a pattern.

A capacitive sensing panel may be provided in a touchscreen panel for an electronic device such as a smart phone, GPS device, tablet computer, mobile media player, remote control device, or any other device capable of using a touchscreen panel. The sensing panel includes a patterned array of conductive features arranged in an overlapping configuration. For instance, the patterned array of conductive features may include sets of overlapping lines, conductive pads, interleaved structures, diamond structures, lattice structures, and the like. The overlapping conductive features may form capacitive nodes at various points of overlap and/or the conductive features may form capacitive nodes between each of the features and a circuit ground. The capacitive sensing panel may evaluate changes in capacitance at each capacitive node to detect a user touch or hover, such as by a finger or other body part as well as by a tool such as a stylus.

SUMMARY

A method of touch island integrity checking includes identifying a first set of touched nodes of a capacitive sensing panel by a first mode of operation and identifying a second set of touched nodes of the capacitive sensing panel by a second mode of operation. The method includes creating a processing mask based on the second set of touched nodes, and classifying all nodes of the first set of touched nodes in response to the processing mask. The method further includes indicating a processing status including one of a success state and a failure state in response to the classifying.

A further method of touch island integrity checking includes identifying mutual capacitance touched nodes of a capacitive sensing panel by a mutual capacitance mode, identifying self-capacitance touched nodes of the capacitive sensing panel by a self-capacitance mode, and creating a node mapping overlay based on self-capacitance touched nodes. The method also includes mapping mutual capacitance touched nodes into touch islands according to the node mapping overlay and confirming a touch island integrity in response to the mapping.

A touch screen controller is disclosed. The controller includes a node identification engine configured to identify a first set of touched nodes of a capacitive sensing panel by a first mode of operation and to identify a second set of touched nodes of the capacitive sensing panel by a second mode of operation. The controller also has a mask generation engine configured to create a processing mask based on the second set of touched nodes and a node classification engine configured to classify the nodes of the first set of touched nodes in response to the processing mask. The controller further includes a classified node processing engine configured to indicate a processing status including one of a success state and a failure state in response to the classifying.

In an embodiment, a method comprises: identifying mutual touch islands, wherein each mutual touch island contains certain mutual capacitance nodes of a capacitive sensing panel; identifying self-capacitance touched nodes of the capacitive sensing panel along a first axis of the capacitive sensing panel; identifying self-capacitance touched nodes of the capacitive sensing panel along a second axis of the capacitive sensing panel; and confirming integrity of the mutual touch islands if: a) a maximum number of the identified self-capacitance touched nodes along the first or second axes is less than or equal to a count of the identified mutual touch islands; and b) the count of the identified mutual touch islands is less than or equal to a peak area, wherein the peak area is equal to the number of the identified self-capacitance touched nodes along the first axis multiplied by the number of the identified self-capacitance touched nodes along the second axis.

BRIEF DESCRIPTION OF DRAWINGS

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

Embodiments are illustrated by way of example in the accompanying figures not necessarily drawn to scale, in which like numbers indicate similar parts, and in which.

DETAILED DESCRIPTION OF THE DRAWINGS

Figure 1A:
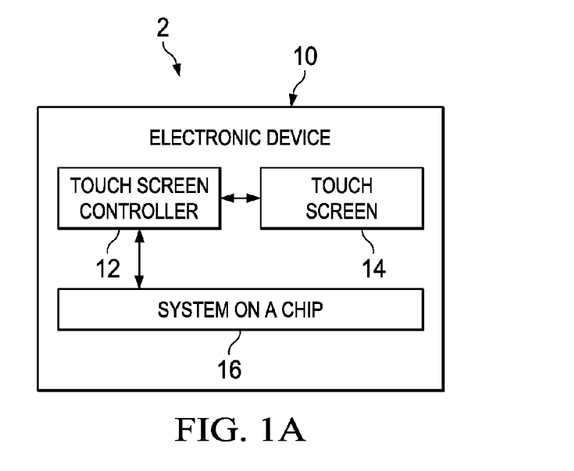
FIG. 1A illustrates an electronic device having a multi-touch capacitive touch screen configured to receive user input, in accordance with various embodiments.

With reference to FIG. 1A, an electronic device 2 comprises any device configured to receive user input. For example, an electronic device 2 may comprise a smart phone, a GPS device, a tablet computer, a mobile media player, a remote control device, or any other device as desired. The electronic device 2 further comprises a touch sensitive interface system 10. A touch sensitive interface system 10 is configured to accept user input via touching such as from the user's body and/or a tool such as a stylus. The touch sensitive interface system 10 also provides output, such as by a human-readable display.

More specifically, the touch sensitive interface system 10 comprises a multi-touch capacitive touch screen 14, a touch screen controller 12, and a system on a chip 16. The system on a chip 16 may comprise a processer, interface, circuitry, and/or the like configured to direct the flow of input and output data to a multi-touch capacitive touch screen 14 and an associated touch screen controller 12. A touch screen controller 12 is configured to be in logical communication with the system on a chip 16. The touch screen controller 12 comprises a processor and a memory in logical communication with the multi-touch capacitive touch screen 14. The touch screen controller 12 may perform various methods with respect to the multi-touch capacitive touch screen 14 as discussed further herein.

Figure 2:
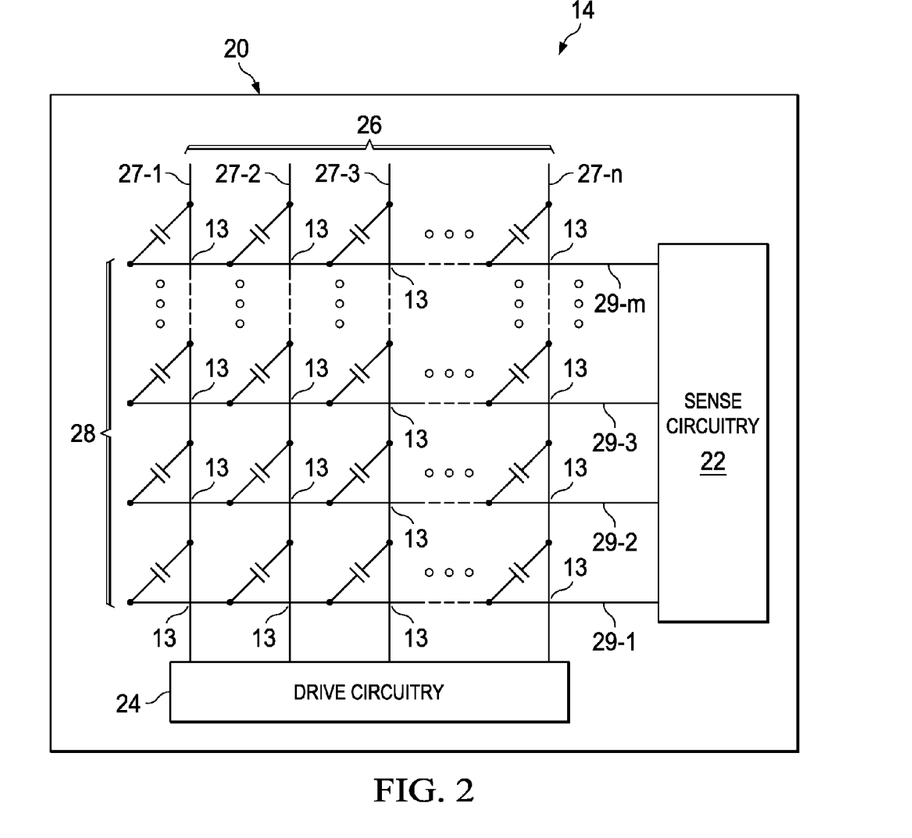
FIG. 2 illustrates a capacitive sensing panel of the multi-touch capacitive touch screen, in accordance with various embodiments.

With reference to FIG. 2, a multi-touch capacitive touch screen 14 includes a capacitive sensing panel 20. The capacitive sensing panel 20 includes a drive array 26 and a sense array 28 operable by a touch screen controller 12 in a mutual capacitance mode and a self-capacitance mode. A drive array 26 comprises an array of conductive features arranged in a matrix with respect to the sense array 28. Similarly, the sense array 28 comprises an array of conductive features arranged in a matrix with respect to the drive array 26. For example, the drive array 26 comprises a first drive line 27-1, a second drive line 27-2, a third drive line 27-3, and any number n of drive lines, such as including an $n^{th}$ drive line 27-n. In like manner, the sense array 28 comprises a first sense line 29-1, a second sense line 29-2, a third sense line 29-3, and any number m of sense lines, such as including an $m^{th}$ sense line 29-m. In various embodiments, an equal number of sense lines 29 and drive lines 27 exist, whereas in further embodiments, the number of sense lines 29 and drive lines 27 differ. Moreover, the touch screen controller 12 may repurpose various sense lines 29 to function as drive lines 27, and various drive lines 27 to function as sense lines 29, from time to time. For example, during a self-capacitance mode discussed below, one or more drive lines 27 or sense lines 29 may perform both drive and sense functions, for instance, a drive line 27 may also serve as a sense line 29 so that self-capacitance (rather than mutual capacitance) is monitored.

The drive array 26 and the sense array 28 may overlap. While FIG. 2 depicts the drive lines 27 of the drive array 26 overlapping the sense lines 29 of the sense array 28 orthogonally, one may appreciate that other shapes than lines may be implemented, and the shapes may overlap other than orthogonally, for instance, such as being interleaved, or at various angles, or otherwise, as desired.

The drive array 26 is connected to drive circuitry 24. The drive circuitry 24 excites one or more drive lines of the drive array 26 such as with an electrical waveform. The sense array 28 is connected to sense circuitry 22. The sense circuitry 22 detects voltage and/or current perturbations on one or more sense lines of the sense array 28 that may be induced in response to the electrical waveform on the drive array 26 and/or further in response to external influences such as the presence of a finger, stylus, or unwanted material such as water. In various embodiments, these perturbations arise from capacitive interaction between the drive array 26, the sense array 28, and/or proximate objects such as a finger or stylus that is interacting with the multi-touch capacitive touch screen 14. As such, one may say that the drive array 26 and sense array 28 share "nodes," wherein a node 13 arises at each intersection of a sense line 29 or drive line 27 with a drive line 27 or sense line 29, respectively. In various embodiments, such an arrangement facilitates operation in a mutual capacitance mode discussed below.

Furthermore, the drive array 26 and sense array 28 may operate independently so that a single node 13 arises between a drive line 27 and/or sense line 29 and a circuit ground, rather than nodes 13 corresponding to intersections of drive lines 27 of the drive array 26 and sense lines 29 of the sense array 28. For instance, the drive array 26 is connected to drive circuitry 24 and has one or more drive lines 27 excited by the drive circuitry 24 with an electrical waveform. The drive array 26 may also serve as a sense array 28, thus having a dual purpose. Induced voltage and/or current perturbations may arise on a drive line 27 as a result of the presence of a finger, stylus, or unwanted material such as water, parasitically sinking current from the drive line 27 to a ground. Thus, each drive line 27 of the drive array 26 may be considered to be a single node 13, as may each sense line 29 of the sense array 28. Stated another way, each line may be conceptualized as having multiple nodes, as is the case when the mutual capacitance mode is implemented, but every node of the line may be considered equipotential with every other node of the line, so that the line is effectively a single node. While the drive array 26 and sense array 28 are depicted as separate arrays of orthogonal lines in FIG. 2, one may appreciate that the drive array 26 may be its own sense array 28, and vis-a-versa. In various embodiments, such an arrangement facilitates operation in a self-capacitance mode.

As briefly mentioned, a capacitive sensing panel 20 operates in at least two distinct modes, a mutual capacitance mode and a self-capacitance mode.

In a self-capacitance mode, the touch screen controller 12 configures the sense circuitry 22 to sense the capacitance between any given column or row (e.g., a sense line 29 forming a node 13/equipotential nodes 13) and a surrounding panel reference (for example, ground). By sensing a change in self-capacitance for the given column or row, the sense circuitry 22 detects a user touch or hover at or near that given column or row. Advantageously, self-capacitance mode sensing provides better rejection of unwanted foreign matter, such as water, in contact with the multi-touch capacitive touch screen 14. Unfortunately, self-capacitance mode sensing is prone to a ghosting problem associated with a multi-touch situation because the entire length of the given column or row of the sense line 29 is used to sense (e.g., the entire sense line 29 forms a single node 13) and thus the sense circuitry 22 is not able to unambiguously distinguish between different touch/hover instances falling along a same row or column.

In a self-capacitance mode, the touch screen controller 12 directs the drive circuitry 24 to excite the drive array 26 with a waveform and repurpose the drive array 26 to serve a dual role also as a sense array 28, and/or may repurpose the sense circuitry 22 to further function as a drive circuitry 24, driving the sense array 28 with a waveform. The touch screen controller 12 monitors the amount of charge (or current) needed to substantially fully charge a capacitance disposed between one or more associated nodes 13 of the array and a circuit ground. The stored charge may discharge via a current directly coupled from the node 13 to a finger, stylus or other touch (and to a lesser degree, via fringe field coupling to adjacent nodes 13). A water droplet increases the fringe field strength, enhancing the capacitive coupling between the node 13 and adjacent nodes 13 of adjacent lines. However, because the adjacent nodes 13 of adjacent lines are much smaller current sinks than a finger, stylus or other touch, the effect of a water droplet is substantially less than that of a desired touch and may be filtered out as an error. Moreover, the effects of a water droplet may be even further diminished by driving the adjacent lines with a waveform similar or identical to that exciting the drive array 26, in this manner, substantially zeroing any potential difference between the node 13 and adjacent nodes 13 of the adjacent lines, and thus substantially zeroing any potential current flow via a fringe field between nodes 13.

In a mutual-capacitance mode, the touch screen controller 12 configures the sense circuitry 22 to sense the capacitance at an intersection point (node 13) between one column/row of a sense line 29 and one row/column of a drive line 27. Thus, each row or column is associated with multiple nodes 13 in a mutual-capacitance mode, whereas each is associated with only a single node 13 in a self-capacitance mode. By sensing a change in mutual-capacitance at a given node 13 between a sense line 29 and a drive line 27, the sense circuitry 22 detects a user touch or hover at or near that given intersection point. Advantageously, mutual-capacitance mode sensing provides higher resolution for detecting the particular location of a user touch or hover, and enables the sense circuitry 22 to distinguish between and identify the locations of multi-touch/hover situations, including along the same row or column. Unfortunately, a mutual-capacitance mode is prone to falsely detecting unwanted foreign matter, such as water in contact with the multi-touch capacitive touch screen 14 as a touch, because the water also changes the mutual-capacitance at an affected node 13.

During a mutual capacitance mode, the touch screen controller 12 evaluates the capacitance existing between the drive array 26 and sense array 28 at each node 13 while directing the drive circuitry 24 to excite the drive array 26 with a waveform. The touch screen controller 12 directs the sense circuitry 22 to monitor the sense array 28 to quantify a potentially coupled signal coupled to the sense array 28 from the drive array 26. For instance, a fringe field may couple the sense array 28 to the drive array 26 at the location of each node 13. A finger, stylus, or other touch desired to be detected effectively steals charge from the node 13 by diverting current that would otherwise pass through the fringe field between the sense array 28 and drive array 26 to a current sink, such as ground. As such, a net reduction in mutual capacitance at the node 13 occurs. Furthermore, a water droplet increases the fringe field strength, enhancing the capacitive coupling between the sense array 28 and drive array 26 at the node 13 and increasing the flow of current through the fringe field between the sense array 28 and the drive array 26, introducing anomalies to the sensed waveform detected by the sense circuitry 22. One may appreciate that a water droplet increases coupling (and current transfer) and increases capacitance between the sense array 28 and drive array 26 at the node 13, while a touch steals charge from the node 13 and decreases the capacitance. As such, a touch and a water droplet are in some instances identifiable by their opposite effect on capacitance at each node 13. The effect of water may balance, or overpower the effect of a touch, causing detection errors.

While the mutual capacitance mode enables detection of multiple simultaneous touches along a same row or a same column, the self-capacitance mode enables the differentiation of finger or stylus touches from water droplets at the cost of being less able to resolve multiple simultaneous touches along a same row or a same column. The opposite advantages and disadvantages of self-capacitance mode and mutual-capacitance mode often lead the system designer to choose operation of the panel in one or the other mode based on whether the panel is being provided in an environment where water rejection is preferred or an environment where multi-touch detection (with accurate location resolution) is preferred. Furthermore, the system may be chosen to change from one mode to another, or to operate in both modes. The date generated by each mode may be combined to resolve touches. However, because the two modes are relatively independent, there is a need in the art for solutions which would enable a panel to enjoy the benefits of both self-capacitance mode and mutual-capacitance mode while also identifying when the two modes diverge so that the integrity of the data produced may be determined to be more or less reliable.

Figure 1B:
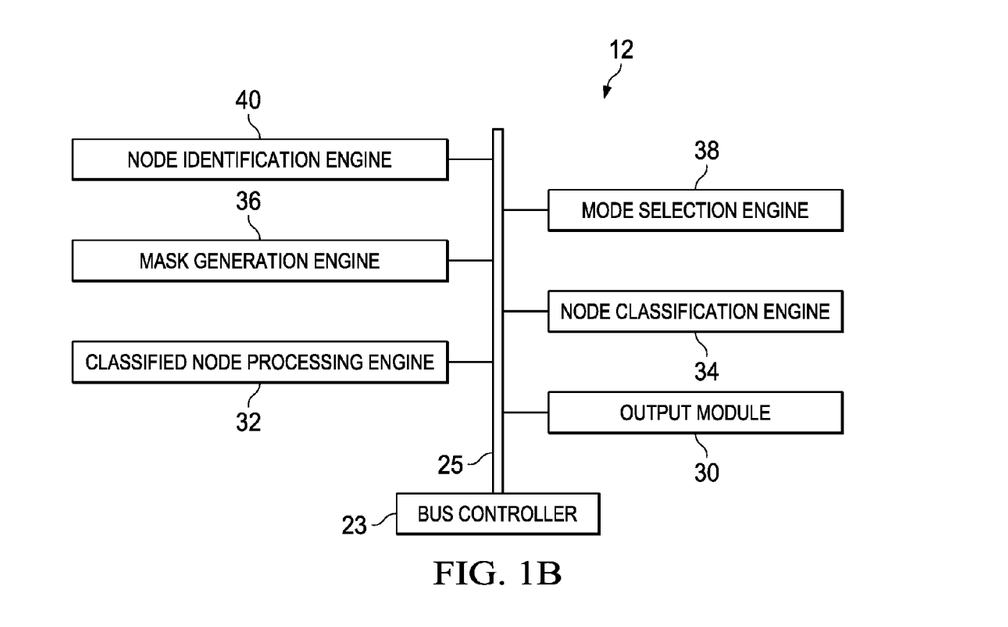
FIG. 1B illustrates a logical structure of a touch screen controller, in accordance with various embodiments.
Figure 3:
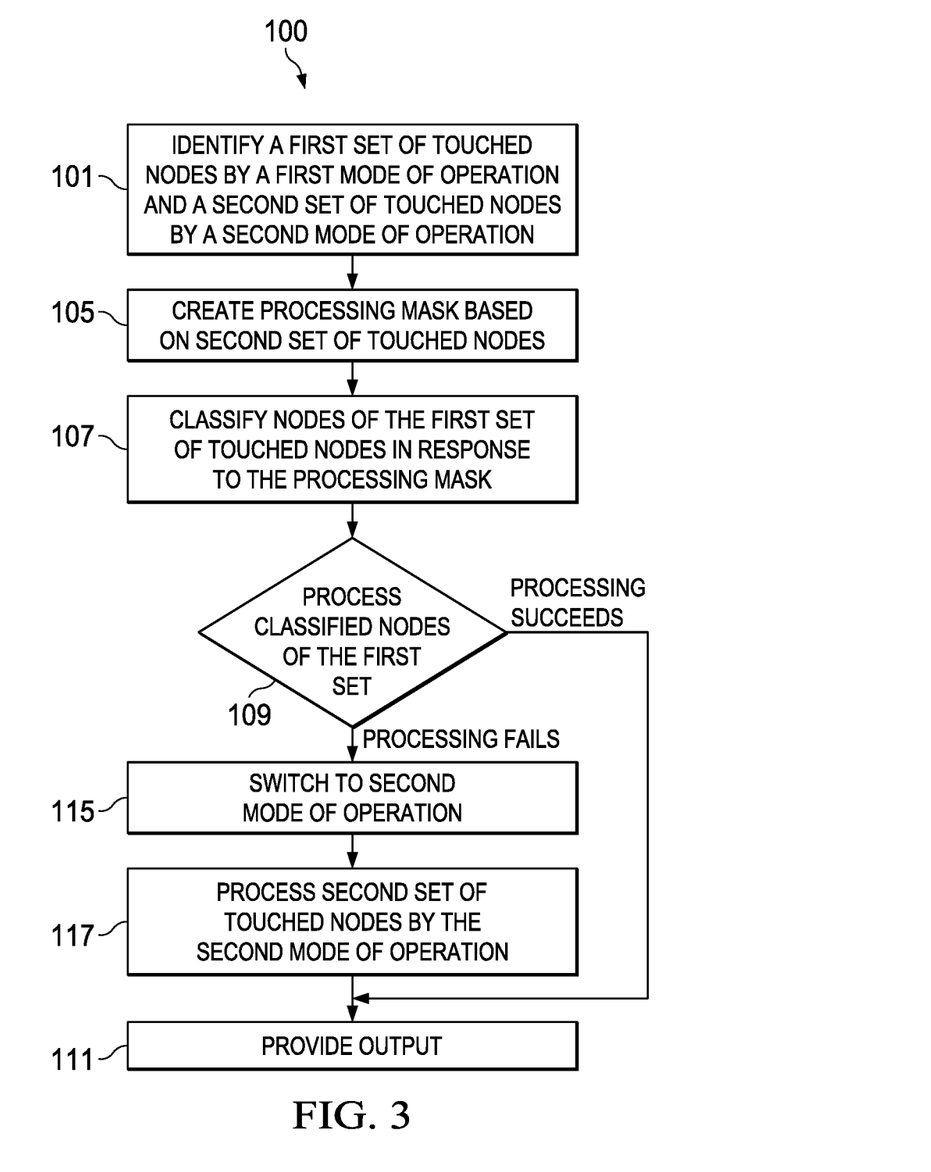
FIG. 3 illustrates a method for multi-touch integrity sensing for the multi-touch capacitive touch screen, in accordance with various embodiments.

With reference to FIG. 1B and FIG. 3, a touch screen controller 12 may comprise various logical modules, which, in connection with the electronic device 2 of FIG. 1B, and the multi-touch capacitive touch screen 14 of FIGS. 1A and 2, may interoperate to execute various computer implemented methods, such as a method for multi-touch integrity sensing for the multi-touch capacitive touch screen 100 (FIG. 3) as discussed further herein.

A touch screen controller 12 may comprise a bus 25 and a bus controller 23. The bus 25 may comprise a physical bus, or may comprise a logical bus resident in the touch screen controller 12. Moreover, the bus controller 23 may comprise a logical unit of the touch screen controller 12 configured to direct communication between and among the different engines and modules connected to the bus 25.

The touch screen controller 12 may comprise a node identification engine 40. A node identification engine 40 may comprise an aspect of a processor and/or electronic storage memory configured to identify a first set of touched nodes by a first mode of operation and a second set of touched nodes by a second mode of operation (step 101). For instance, a first mode of operation may be a mutual capacitance mode or a self-capacitances mode. Similarly, a second mode of operation may be a self-capacitance mode or a mutual capacitance mode. In various embodiments, the first mode of operation and the second mode of operation are different modes.

The touch screen controller 12 may also comprise a mask generation engine 36. A mask generation engine 36 may communicate with the node identification engine 40 via the bus 25 under instruction of the bus controller 23 and may receive data representing a plurality of touched nodes. For instance, the mask generation engine 36 may receive data representing the second set of touched nodes. In response to receiving the data representing the second set of touched nodes, the mask generation engine 36 may perform various calculations to form a union of the second set of touched nodes with mask rules to create a processing mask based on the second set of touched nodes. As used herein, a processing mask means a data array indicating the state information of each node of the capacitive sensing panel 20. State information may comprise a scalar numerical value representative of the strength of the capacitance associated with that node in the second mode. State information may comprise a vector value representative of a change of capacitance associated with that node during at least one of the first mode and the second mode over time. Moreover, state information may comprise a quality index associated with that node and indicative of a likelihood that that node comprises a touched node (e.g., a node that has a capacitance associated with a wanted touch such as a stylus touch or a finger touch and not associated with an unwanted touch such as caused by foreign matter, including water.)

Thus, the second set of touched nodes may comprise self-capacitance touched nodes which are less susceptible to the corrupting influence of foreign material, but which afford a lesser degree of positional resolution for touches than do mutual-capacitance touched nodes. The state information may be a scalar value representing a self-capacitance strength for each node. Moreover, the state information may include a self-capacitance touch flag, which is a binary value indicating whether the self-capacitance strength exceeds a self-capacitance touch threshold. The self-capacitance touch threshold may be a predetermined value, and self-capacitance strengths that exceed this threshold may be associated with a wanted touch such as a finger or stylus touch, while those that do not exceed this threshold are not associated with a wanted touch. In this manner, it may be said that the mask generation engine 36 creates a processing mask based on a second set of touched nodes (step 105).

The touch screen controller 12 may comprise a node classification engine 34. The node classification engine 34 classifies nodes of the first set of touched nodes in response to the processing mask (step 107). The mask generation engine 36 passes the processing mask to the node classification engine 34 via the bus 25 at the direction of the bus controller 23 and the node identification engine 40 passes the first set of touched nodes to the mask generation engine 36 via the same. A classified node processing engine 32 may receive the processing mask, which is based on the second set of touched nodes, and may receive data representative of the first set of touched nodes, and may output a classification of the first set based on the processing mask. One such classification is an integrity index. An integrity index may be a numerical value associated with each node of the first set of nodes, the magnitude of which is directly correlated to one or more variable of the processing mask.

For example, the state information within the processing mask may include a self-capacitance touch flag. The first set of touched nodes may comprise mutual capacitance touched nodes and each variable of the set may include a mutual capacitance strength of one such node. By performing mathematical computations involving the union of the first set of touched nodes to the processing mask, an integrity index value may be generated for each mutual capacitance touched node showing whether that node is associated with a valid touch (touch state), is associated with foreign material such as water (foreign material state) or is associated with a detection error (null state).

For example, the node classification engine 34 returns a touch state if both the mutual capacitance strength and the self-capacitance touch flag for a node indicate a valid touch. For instance, if the self-capacitance touch flag indicates a touch, and the mutual capacitance strength exceeds a first mutual capacitance strength threshold, a valid touch may be indicated. The node classification engine 34 may return a foreign material state if the self-capacitance touch flag fails to indicate a valid touch, while the mutual capacitance strength fails to indicate a similar valid touch. The node classification engine 34 may return a null state if the self-capacitance touch flag and the mutual capacitance strength indicate contradictory statuses.

Finally, the node classification engine 34 may pass the integrity index value of the classified nodes to the classified node processing engine 32 via the bus 25 under the direction of the bus controller 23. The classified node processing engine 32 may process classified nodes of the first set (step 109). More specifically, the classified node processing engine 32 may evaluate the integrity index value of the classified nodes against integrity rules. In the event that the processing succeeds (integrity rules are met), the classified node processing engine 32 transmits processed results to the output module 30 for distribution to further systems and methods ("Processing Succeeds"). The output module 30 provides output to further systems and methods at the direction of the bus controller 23 and via the bus 25 (step 111).

In response to the processing failing (integrity rules are not met), the node classification engine 34 directs the mode selection engine 38 to switch the touch screen controller 12 to a second mode of operation (step 115), so that touch sensing may continue by a different mechanism. In the second mode of operation, aspects of the touch screen controller 12 such as the classified node processing engine 32 process the first set or the second set of touched nodes by a second mode of operation (step 117). A second mode of operation may include evaluating different nodes in different ways, for instance, evaluating the second set of touched nodes (self-capacitance touched nodes) in view of different integrity rules than were applied in the failed evaluation of the first set of touched nodes (mutual capacitance touched nodes). The second mode of operation proceeds and concludes again with the output module 30 providing output to further systems and methods at the direction of the bus controller 23 and via the bus 25 (step 111).

Figure 4A:
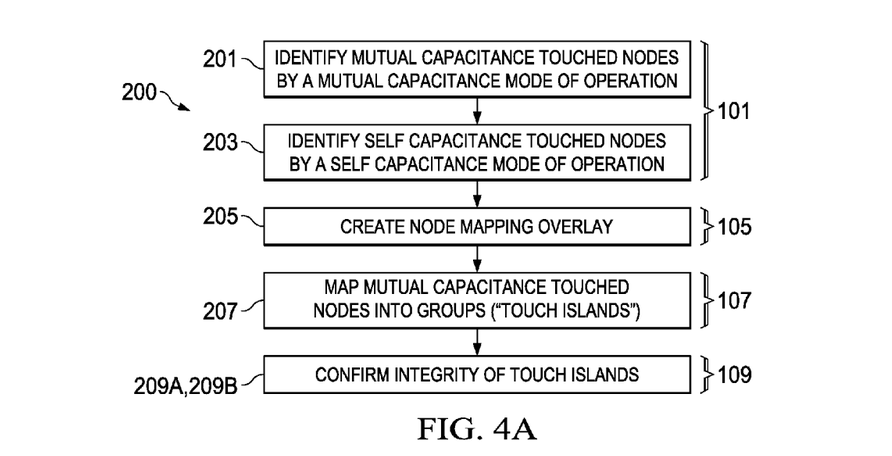
FIG. 4A illustrates a method for multi-touch integrity sensing including touch island integrity checking, in accordance with various embodiments.

With reference to FIGS. 1B, 3, 4A, and 5, a method for multi-touch integrity sensing for the multi-touch capacitive touch screen 100 may be further refined as illustrated in FIG. 4A. For instance, a method for multi-touch integrity sensing including touch island integrity checking 200 may include various refinements of various steps of the method for multi-touch integrity sensing for the multi-touch capacitive touch screen 100. For example, the method for multi-touch integrity sensing including touch island integrity checking 200 may comprise identifying mutual capacitance touched nodes and creating a first touch island 52-1 and a second touch island 52-2 of these nodes by a mutual capacitance mode of operation (step 201 of step 101). Throughout this disclosure, a touched node is a node 13 (FIG. 2) associated with a charge indicative of a touch. Each the touched nodes of the mutual capacitance mode forms one or more touch island. A touch island is a grouping of nodes with each node adjacent to at least one other node of an adjacent row/column, both having a mutual capacitance strength with an value greater than a first mutual capacitance strength detection threshold.

Subsequently, self-capacitance touched nodes along a first axis 42 and second axis 44 may be identified in a self-capacitance mode of operation (step 203 of step 101). The identified self-capacitance touched nodes may be processed to create a node mapping overlay 46 (step 205 of step 107). The node mapping overlay 46 based on the identified self-capacitance touched nodes is a specific instance of a processing mask based on a second set of touched nodes. The node mapping overlay 46 comprises a matrix of values that depict areas of a valid touch (active region 61) and that depict areas lacking a valid touch (inactive region 62) with distinctive indications, such as a binary indication, or a matrix of scalar values that will indicate the presence or absence of a valid touch once compared to a threshold. The valid touches that are identified in the self-capacitance mode are identified by determining the intersection of a row node associated with a self-capacitance strength maxima such as TX_Peak 50 with a column node associated with a self-capacitance strength maxima such as RX_Peak 48. Subsequently, the mutual capacitance touched nodes are mapped into the active region 61 and the inactive region 62 by overlaying the node mapping overlay 46. As one may appreciate by viewing FIG. 5, the first touch island 52-1 is confirmed as a valid touch island because it is within the active region 61, while the second touch island 52-2 is ignored as an invalid touch island because it is within the inactive region 62 (step 207 of step 107). As a further verification, the integrity of the valid touch island(s), which in this instance is only first touch island 52-1, is confirmed (step 209 of step 109). As mentioned previously, the integrity will be confirmed by evaluating an integrity index value of the classified nodes (in this instance, the first touch island 52-1) against integrity rules.

Figure 4B:
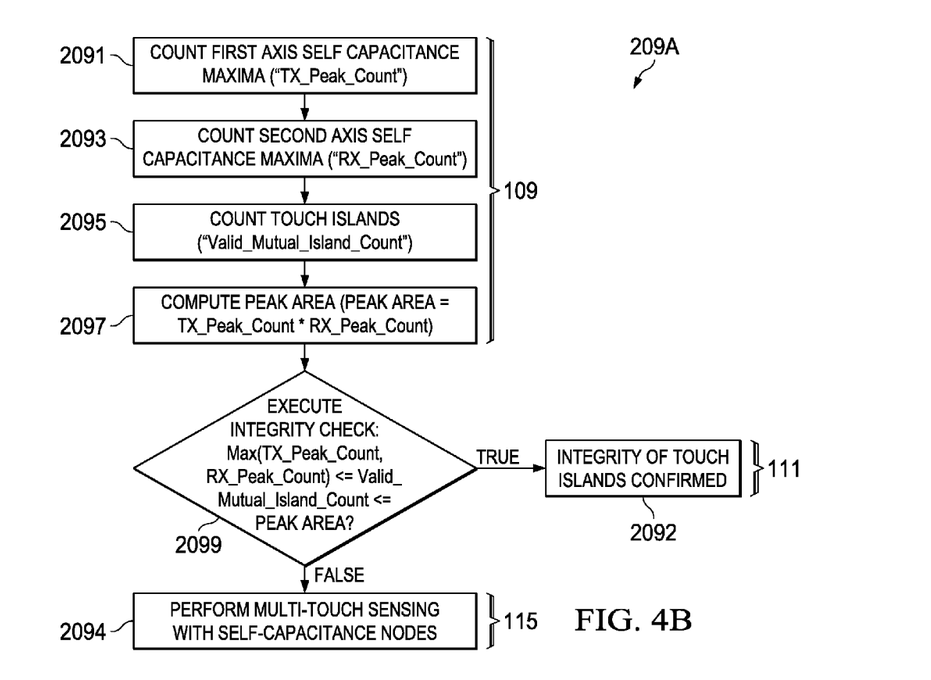
FIG. 4B illustrates a method for touch island integrity checking and multi-touch sensing with self-capacitance nodes, in accordance with various embodiments.
Figure 4C:
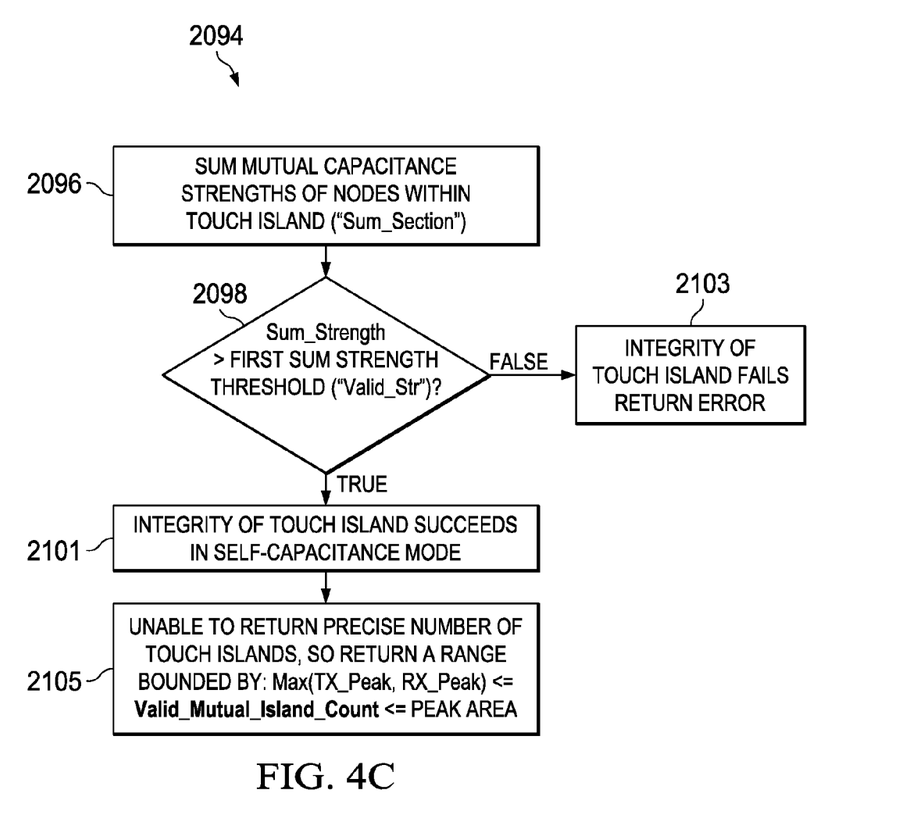
FIG. 4C illustrates a method of multi-touch sensing with self-capacitance nodes, in accordance with various embodiments.

FIGS. 4B, 4C depict a first method of confirming the integrity (step 209). With reference now to FIGS. 1B, 3, 4A-C, and 5, a first method of confirming the integrity comprises a method for touch island integrity checking and multi-touch sensing with self-capacitance nodes 209. As used with reference to method 209, "integrity" means that the number of identified touch islands is consistent with various integrity rules. In other words, the data available to the classified node processing engine 32 does not contain internal inconsistencies which would suggest error. The method 209 includes five sub-steps to effectuate the comparison of the integrity index against integrity rules in order to confirm the integrity of the touch islands. For example, a first integer count of the number of first axis 42 self-capacitance maxima 50 ("TX_Peak") among the self-capacitance touched nodes is summed (step 2091) ("TX_Peak_ Count"). A second integer count of the number of second axis 44 self-capacitance maxima 48 ("RX_Peak") among the self-capacitance touched nodes is summed (step 2093) ("RX_Peak_Count"). Finally, a third integer count of the number of valid touch islands, which in this instance has been previously determined to be one touch island, the first touch island 52-1 is summed (step 2095) ("Valid_Mutual_ Island_Count"). A peak area ("Peak Area") is computed comprising the product of TX_Peak_Count multiplied by RX_Peak_Count (step 2097).

Having derived these values, a touch island integrity check truth statement is executed. Specifically, this integrity check comprises evaluating the truth or falsity of the following statement (step 2099):

Max(TX_Peak_Count, RX_Peak_Count) <=Valid_Mutual_Island_Count<=Peak Area

Figure 5:
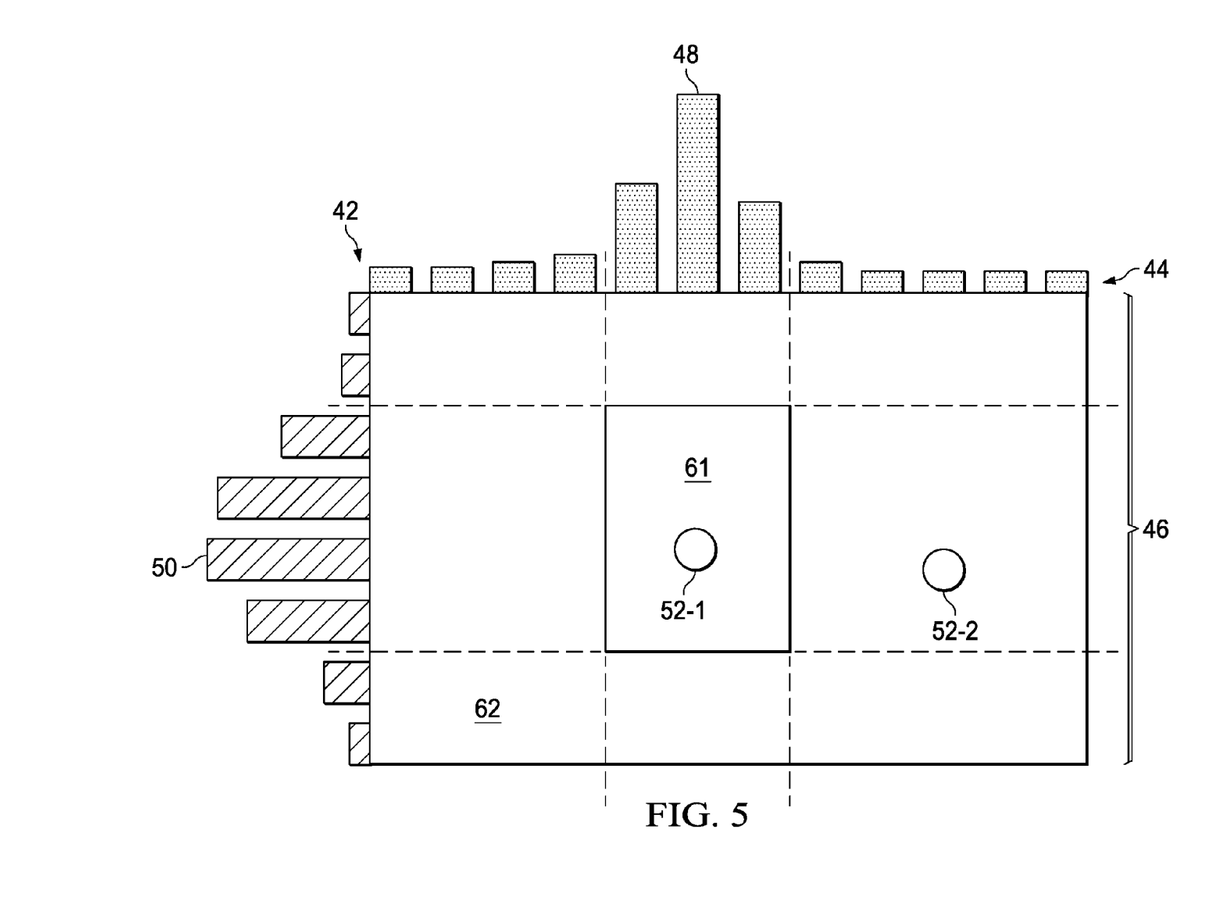
FIGS. 5-6 depict touch scenarios involving multiple touch islands.

For FIG. 5, the statement would be:

MAX(1,1)<=1<=1*1 which would be TRUE, however, if second touch island 52-2 had not been excluded for lying outside of the active region of the node mapping overlay 46, the statement would have returned FALSE and it would be apparent that the integrity of the data developed in the preceding steps of method 300 was lacking. By concluding with an integrity check 209 false indications of touch may be diminished.

As briefly mentioned, if the check returns TRUE, the integrity of the touch islands are confirmed (step 2092 of step 111). If the check returns FALSE, the integrity of the touch islands are not confirmed, and so the second set of touched nodes is processed by a second mode of operation, specifically, multi-touch sensing is performed with self-capacitance nodes of first axis 42 and second axis 44, rather than mutual capacitance nodes (step 2094 of step 115). This transition to a second mode of operation is done because the data available to the classified node processing engine 32 contains internal inconsistencies which would suggest that some of the data collected in the mutual capacitance mode is erroneous. The presence of this erroneous data may lead to incorrect detection of or failure to detect a touch, or inaccurate or imprecise resolution of the placement of the touch.

The specific implementation of step 2094 will be elaborated with particular reference to FIG. 4C. The touch screen controller 12 sums all mutual capacitance strengths for all nodes that are within a touch island 52-1, 52-2 ("Sum_Section") (step 2096). In response to the Sum_Section not exceeding a first sum strength threshold ("Valid_Str"), the integrity of the touch island fails and an error state is returned indicating that multi-touch sensing cannot be performed in both mutual-capacitance and self-capacitance modes (step 2103). Alternatively, in response to the Sum_ Section exceeding Valid_Str (step 2098), there exists sufficient data from the mutual-capacitance mode to suggest a touch, though the data may contain corruption, so that it is not as accurate or precise as desired. Thus, touch island 52-1 or 52-2 is validated and the integrity of the touch island confirmed, but the count remains unknown. However, TX_Peak_Count and RX_Peak_Count have been determined from self-capacitance mode, so that by again applying the rule Max(TX_Peak_Count, RX_Peak_Count) <=Valid_Mutual_Island_Count<=Peak Area, where Valid_Mutual_Island_Count is this time an unknown, a range of potential values of Valid_Mutual_Island_Count is derived. In this instance, the Valid_Mutual_Island_Count is returned as a range, rather than a count of touch islands, because of the limited confirmatory information available during self-capacitance mode, particularly when multiple touches coincide along the same row or column. The Valid_ Mutual_Island_Count is returned as a range (step 2105) which for FIG. 5 would be 1<=Valid_Mutual_Island_ Count<=1. Thus, one may appreciate that the range may in some instances be so small as to be determinative.

Figure 6:
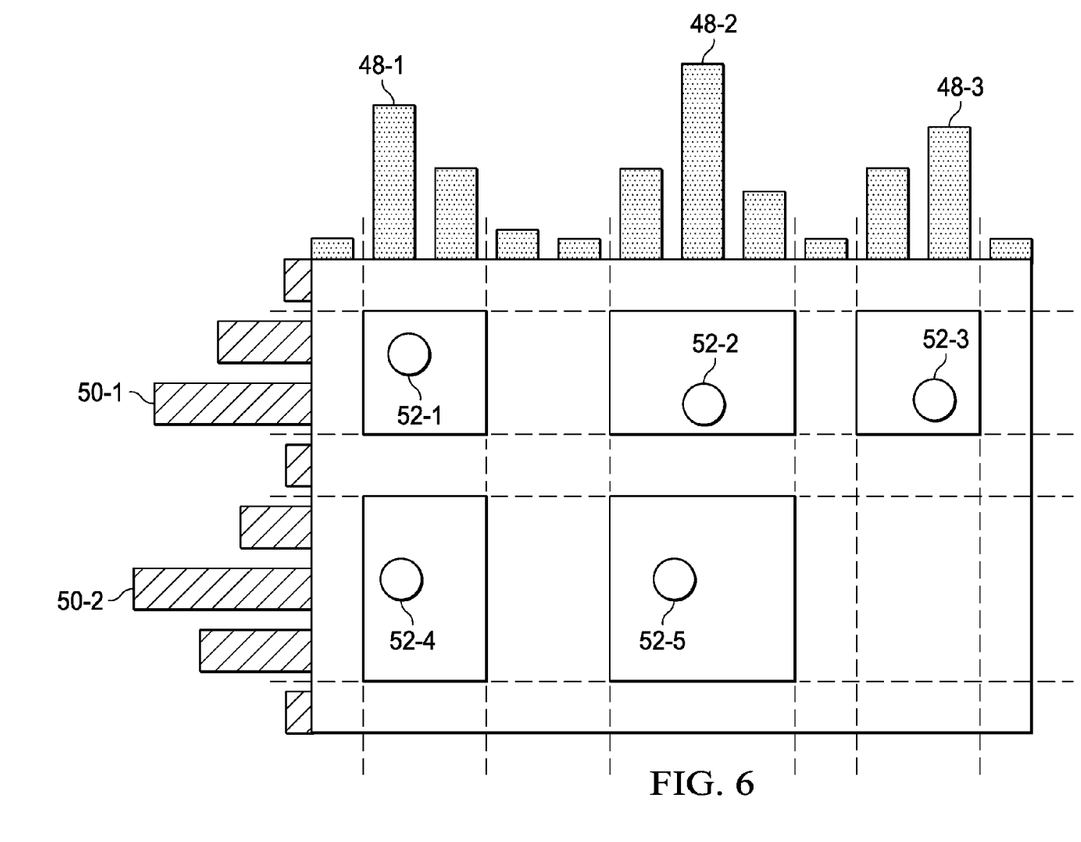

With additional reference to FIG. 6, in other scenarios, the range is not determinative. For instance, FIG. 6 depicts three RX_Peaks 48-1, 48-2, 48-3 and two TX_Peaks 50-1, 50-2. There exist five touch islands 52-1, 52-2, 52-3, 52-4, and 52-5. When the specific implementation of step 2094 is applied, the rule Max(TX_Peak_Count, RX_Peak_Count) <=Valid_Mutual_Island_Count<=Peak Area works out to MAX(2,3)<=Valid_Mutual_Island_Count<=2*3. Thus the Valid_Mutual_Island_Count is known to be between 3 and 6, though the actual count of touch islands is five, as shown in FIG. 6.

An advantage of the disclosed implementation is that the design supports multiple finger touch detection (using the mutual capacitance sensing mode) and water droplet rejection (using the self-capacitance sensing mode). Thus, the design enables provision of very fine multi-touch accuracy and linearity owing to the mutual capacitance sensing operation as well as operation in hostile and mobile environments. While sequential operation of mutual capacitance sensing and self-capacitance sensing modes is discussed for brevity, one may appreciate that a plurality of sense arrays and/or drive arrays may be so arranged as to permit simultaneous operation of a touch screen in both modes.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A method, comprising:
   identifying mutual touch islands, wherein each mutual touch island contains certain mutual capacitance nodes of a capacitive sensing panel;
   identifying self-capacitance touched nodes of the capacitive sensing panel along a first axis of the capacitive sensing panel;
   identifying self-capacitance touched nodes of the capacitive sensing panel along a second axis of the capacitive sensing panel; and
   confirming integrity of the mutual touch islands if:
   a) a maximum number of the identified self-capacitance touched nodes along the first or second axes is less than or equal to a count of the identified mutual touch islands; and
   b) the count of the identified mutual touch islands is less than or equal to a peak area, wherein the peak area is equal to the number of the identified self-capacitance touched nodes along the first axis multiplied by the number of the identified self-capacitance touched nodes along the second axis.

2. The method of claim 1, further comprising, if integrity of the mutual touch islands is not confirmed, then:
   for each mutual touch island, summing mutual capacitance strength values for said certain mutual capacitance nodes included in the mutual touch island;
   determining if the sum of the mutual capacitance strength values exceeds a threshold;
   if yes, confirming integrity of that mutual touch island.

3. The method of claim 2, further comprising identifying a range for a number of detected mutual touch islands that is greater than or equal to the maximum number of the identified self-capacitance touched nodes along the first or second axes but less than or equal to the peak area.

4. A method, comprising:
   identifying touch islands detected using a mutual capacitance sensing operation;
   identifying first touch nodes detected using a self-capacitance sensing operation along a first sensing axis;
   identifying second touch nodes detected using the self-capacitance sensing operation along a second sensing axis; and
   confirming integrity of the identified touch islands if:
   a) a count of the identified mutual touch islands is greater than or equal to a maximum of the number of identified first or second touch nodes; and
   b) the count of the identified mutual touch islands is less than or equal to a peak area, wherein the peak area is equal to the product of the number of first touch nodes and second touch nodes.

5. The method of claim 4, further comprising, if integrity of the touch islands is not confirmed, the confirming the integrity of each touch island if strength of the touch island exceeds a threshold.

6. The method of claim 5, further comprising identifying a range for a number of detected touch islands that is greater than or equal to maximum of the number of identified first or second touch nodes but less than or equal to the peak area.

* * * * *